United States Patent
Scholz et al.

(10) Patent No.: US 9,280,402 B2
(45) Date of Patent: Mar. 8, 2016

(54) SYSTEM AND METHOD FOR UPDATING A DUAL LAYER BROWSER

(75) Inventors: Martin Scholz, Nußloch (DE);
Christian Behrens, Wiesloch (DE);
Steffen Rotsch, Rauenberg (DE)

(73) Assignee: SAP SE, Walldorf (DE)

( * ) Notice: Subject to any disclaimer, the term of this patent is extended or adjusted under 35 U.S.C. 154(b) by 1539 days.

(21) Appl. No.: 11/962,075

(22) Filed: Dec. 20, 2007

(65) Prior Publication Data

US 2009/0164987 A1 Jun. 25, 2009

(51) Int. Cl.
*G06F 17/30* (2006.01)
*G06F 9/54* (2006.01)

(52) U.S. Cl.
CPC .......... *G06F 9/542* (2013.01); *G06F 2209/545* (2013.01)

(58) Field of Classification Search
CPC ................... G06F 17/30643; G06F 17/30887; G06F 17/30861; G06F 17/30365; G06F 17/30345; G06F 2203/04808; G06F 2209/544; G06F 17/30554; G06F 9/542
See application file for complete search history.

(56) References Cited

U.S. PATENT DOCUMENTS

| | | | | |
|---|---|---|---|---|
| 5,818,446 A * | 10/1998 | Bertram | ............... | G06F 9/4443 715/746 |
| 5,842,216 A * | 11/1998 | Anderson | ............. | H04L 1/1678 |
| 6,571,253 B1 * | 5/2003 | Thompson | ........ | G06F 17/30905 |
| 6,910,070 B1 * | 6/2005 | Mishra et al. | ................. | 709/224 |
| 7,353,464 B1 * | 4/2008 | Kundu et al. | ................. | 715/853 |
| 8,601,396 B2 * | 12/2013 | Hunleth | ............... | G06F 3/0482 715/853 |
| 2001/0034771 A1 * | 10/2001 | Hutsch et al. | ................. | 709/217 |
| 2004/0189696 A1 * | 9/2004 | Shirriff | ......................... | 345/738 |
| 2004/0243428 A1 * | 12/2004 | Black et al. | ....................... | 705/1 |
| 2004/0266441 A1 * | 12/2004 | Sinha et al. | ................... | 455/445 |
| 2005/0119910 A1 * | 6/2005 | Schneider | ......................... | 705/1 |
| 2007/0234195 A1 * | 10/2007 | Wells | ......................... | 715/501.1 |
| 2007/0260674 A1 * | 11/2007 | Shenfield | ...................... | 709/203 |

* cited by examiner

*Primary Examiner* — James Trujillo
*Assistant Examiner* — Fatima Mina
(74) *Attorney, Agent, or Firm* — Kenyon & Kenyon LLP

(57) ABSTRACT

A method and system are provided for updating a dual layer browser which displays a hierarchy of nodes. The method or system provides a first layer or "browser provider" which receives various changed data notifications, determines which changed data notifications affect the current browser display, and sends the required notifications to a second layer or "browser." The browser then makes the necessary adjustments to the current display.

19 Claims, 4 Drawing Sheets

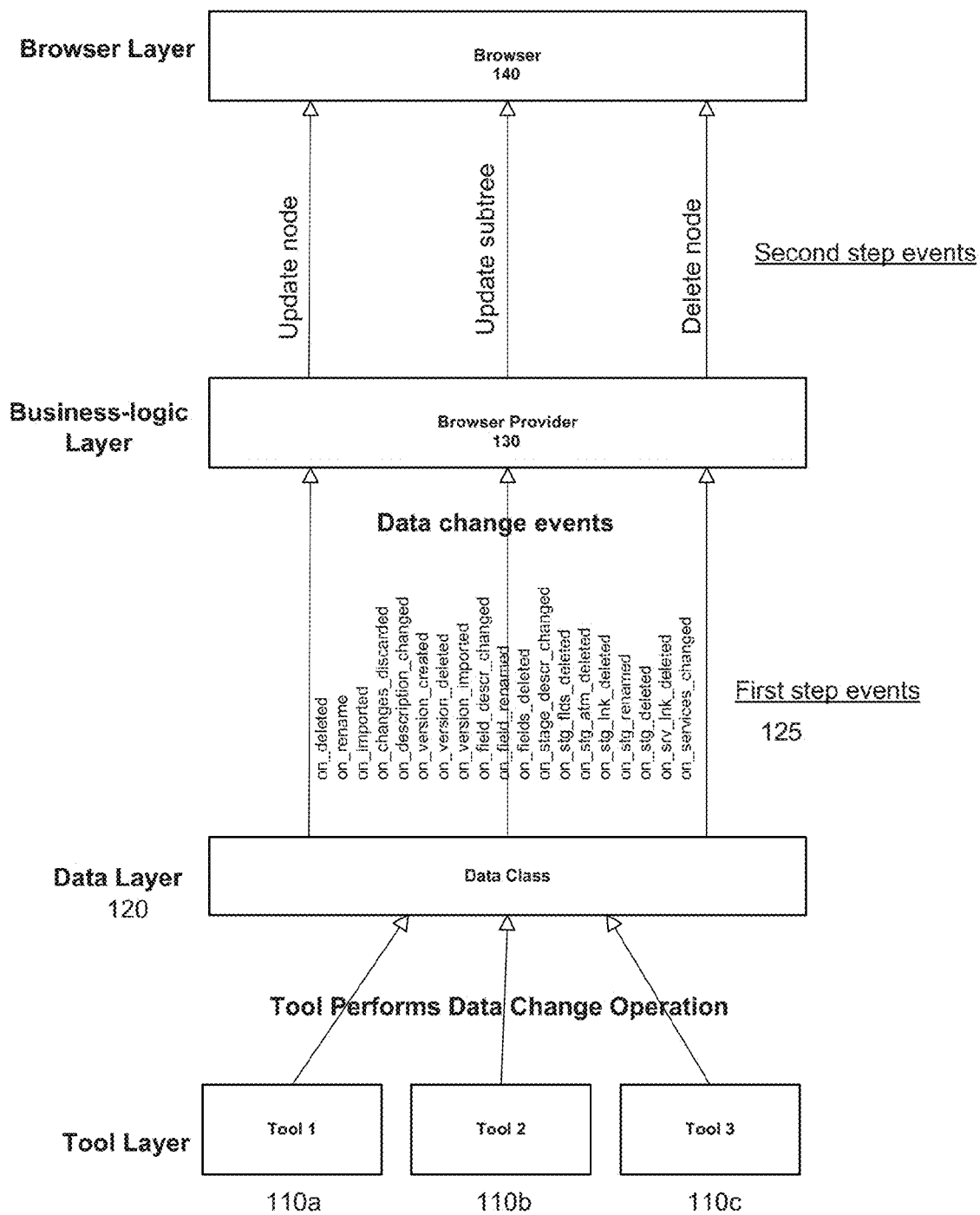

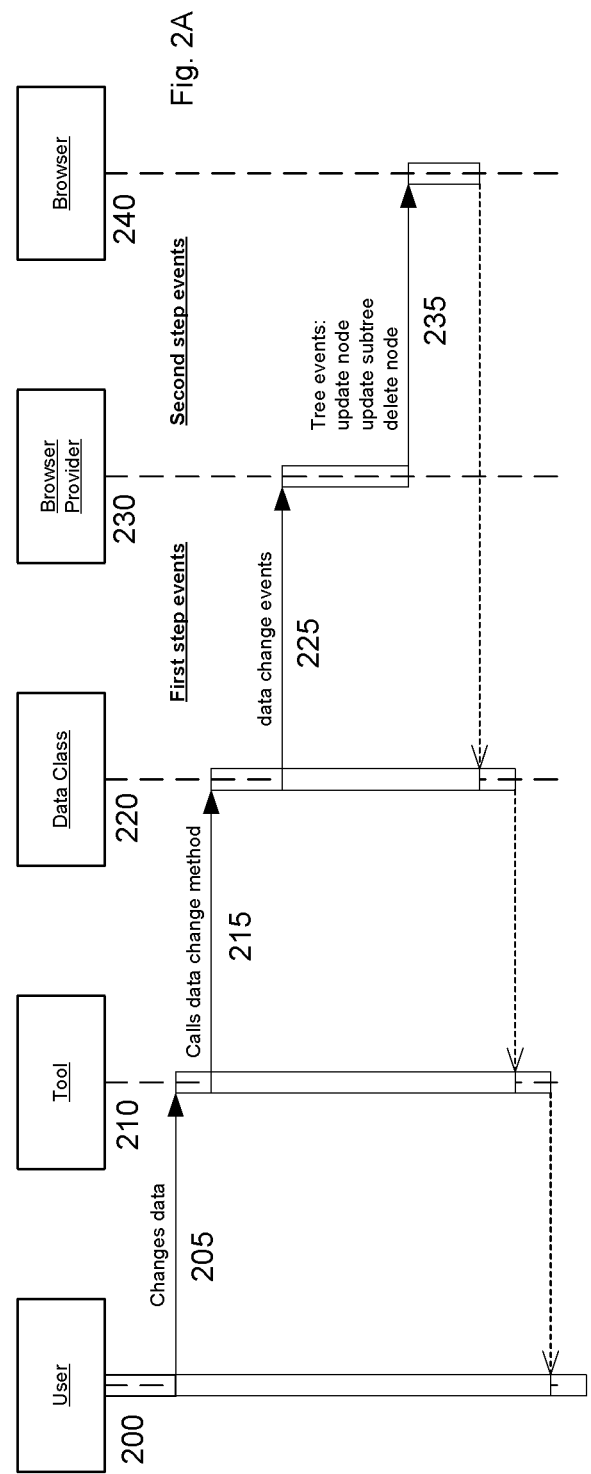

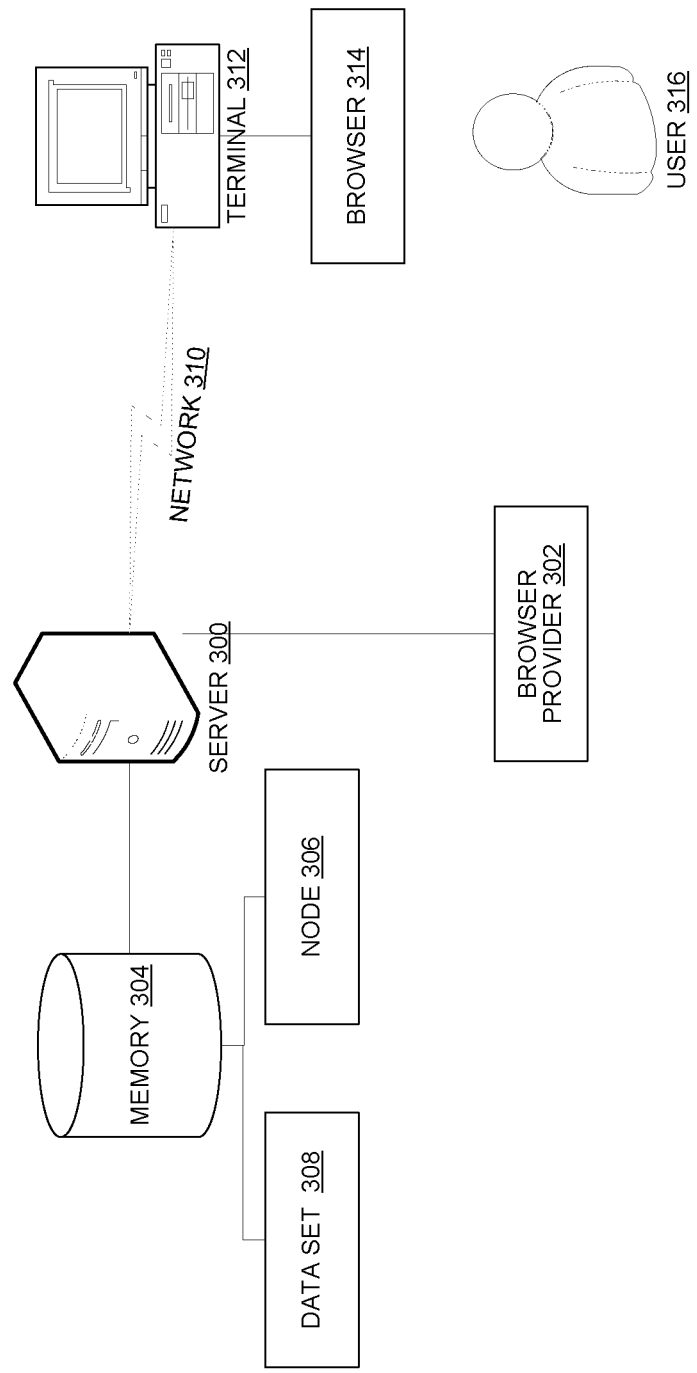

SYSTEM AND METHOD FOR UPDATING A DUAL LAYER BROWSER

BACKGROUND

Modern businesses utilize management and information technology to design, enact, control, and analyze operational business processes involving humans, organizations, applications, documents and other assets. Software may be provided to help with implementing and executing business processes.

A human capital management (HCM) system may automate various human resource processes. For example, an HCM system may automate the functionality of hiring a new employee, terminating an existing employee, reassigning an employee, granting extended leave, etc. Each functionality may require one or more approvals before the request is granted, and the HCM system automates the process of generating the appropriate requests and collecting completed approvals before granting the request if the process was successfully completed. In addition, an HCM system may provide various workforce analytics, which quantifies various aspects of human resources management within the HCM system. To set up such a process, various data sets, databases, and maintenance tools or "business processes" are required.

Business processes may be implemented on an application platform as business scenarios. The application platform may include a plurality of objects, each object represented by a node in a hierarchy. The nodes may be related to each other in child, parent, or sibling relationships. There may be multiple types of objects in the system, each object type including its own unique information.

The nodes may be navigated via a browser. The browser is a software application that enables a user to display and interact with the nodes. For example, a user may navigate among nodes based on their relationships. The nodes may be browsed based on the information associated with each object type.

Previously, a browser was hard-coded with node information and how to handle each node. This complicated the maintenance of the browser, as any changes in node structure required revisions in the browsers. As objects in a system may be extended or added to improve functionality, maintenance of the browser becomes a serious challenge.

Thus, a need exists to provide additional browsing capability to browsers when new objects are added to a system.

SUMMARY

Exemplary embodiments and methods of the present invention provide for a method and system for updating a dual layer browser. The first layer may include a browser provider. A browser provider may be associated with an object or group of objects. The browser provider may receive notifications when data in a data layer of an associated object is changed. The browser provider may be responsible for updating the actual browser which may be the second layer of the dual layer browser. The browser provider may determine which of the notifications need to be passed on to the browser. The browser may then make the necessary updates to the display based on the received update notifications. In an example embodiment, the notifications received by the browser provider include data changed events.

An example embodiment includes the browser provider consolidating the updates before sending them to the browser.

In an example embodiment, the browser has only a minimum level of knowledge about the system it displays, and the browser provider is responsible for providing all of the implementation and update details. In the case of a hierarchy of nodes, this may mean that the browser only knows of the basic tree structure, and the browser provider provides all of the specific hierarchy information, for example the parent/child/sibling information.

In an example embodiment, the dual layer browser displays a hierarchy of nodes.

In an example embodiment, the updates include the updating of a single node, the updating of a subtree, or the deletion of a node.

An example embodiment includes having the browser run on a remote terminal in communication with a server over a network.

An example embodiment implements the system and/or method embodiments described herein in the context of a human capital management system.

BRIEF DESCRIPTION OF THE DRAWINGS

FIG. 1 shows a block diagram of how the different software layers of an example embodiment could relate to each other.

FIG. 2A shows an example procedure for the method of updating the dual layer browser.

FIG. 3 shows an example system for navigating a set of nodes in accordance with an embodiment of the present invention.

DETAILED DESCRIPTION

Figure 2B:
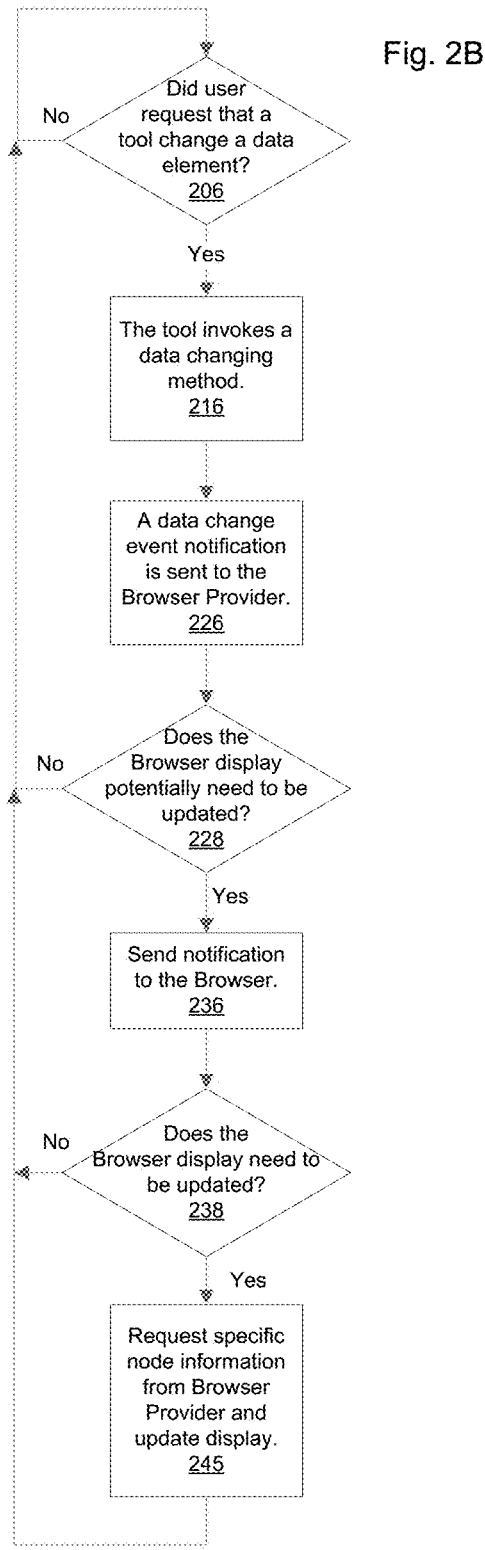
FIG. 2B shows a flowchart of an example procedure for the method of updating the dual layer browser.

A method and system are provided for performing updates to a browser in a system that separates hierarchy definition from the browser. A browser may be provided to navigate a hierarchy of nodes, where each node is an object in a system. A browser provider is provided for each root object or group of related objects in the system, and provides hierarchy definition and interface information of the associated objects to the browser. Interface information includes how to navigate and display the hierarchy associated with the nodes.

Node-specific information, such as, for example, a node name, a node context menu, a node icon, and child/parent relationship(s) may also be retrieved by the browser provider and provided to the browser to be displayed. For example, the node-specific information may be stored in entity tables accessible to the browser provider. In this way the browser need only contain the most general information about the node hierarchy it displays. The more specific information can be provided to the browser by the browser provider associated with the specific node. The browser provider may also be responsible for notifying the browser that a data change has occurred if that data change affects the current browser display.

In an embodiment, the browser provider is responsible for providing essentially all of the information the browser needs to display the node hierarchy. The browser provider may know what nodes might be currently displayed in the browser. In an example, the browser provider receives notifications from the data layer of the objects associated with the particular browser provider. The browser provider will determine if the data which has been changed affects potentially displayed nodes. In an embodiment, if a potentially displayed node is affected, the browser provider sends a data change event (update node, update subtree, delete node) to the browser. If the affected node is currently displayed, the browser then calls the browser provider for node specific information.

In an embodiment of the present invention, the browser provider does not know which nodes are currently displayed. The browser provider only knows which node(s) may be displayed and sends the event(s) for those node(s). The browser then recognizes if the node mentioned within the event(s) is really presented. In such a case, for example, the browser asks the browser provider for data of the node.

FIG. 1 is an example arrangement of the different software layers described above. Elements 110*a,b,c* represent different tool objects available in the system. The tool objects 110 perform any number of functions including those functions that modify data in the data layer 120. In an embodiment, when a data change occurs a "data change event" notification 125 is sent to the browser provider 130. In an embodiment, the browser provider 130 is responsible for keeping the browser 140 updated. In an embodiment, the browser provider 130 parses out any data changed event notification 125 that does not affect the current display in the browser and therefore may not be necessary for the browser to know about. Additionally, when the notifications are such that it is necessary to notify the browser 140, the browser provider 130 may consolidate the update notifications before passing them on to the browser 140. Example second step notifications include a node update, a subtree update, and the deletion of a node.

FIG. 2A shows an example implementation of the present invention. For example, user 200 makes a change to the data 205 using one of the tool objects 210. The tool object calls a data changing method 215, which may do the actual data modification in the data class layer 220. It will be understood in the art that a "layer" is an abstract term, and does not necessarily imply a single unified data area. Each object may have its own data set and these individual data sets comprise the "data layer." In an embodiment, after the modification, a data change event notification 225 is sent to the browser provider 230. The browser provider parses out unnecessary events, consolidate necessary events, and/or send an update notification 235 to the browser 240.

FIG. 2B shows a flowchart of an example embodiment of the present invention. The example procedure waits for a user to use a tool to request some data be changed at 206. It may be the case that the user directly requests a data element change, or it may be the case that the user performs some other action with the tool and a data element is changed as a byproduct of that action. Regardless, at 206, some action may be requested by the user via a tool and as a result some data element may be changed. At 216, the tool will then invoke a data changing method based on the user request. The tool itself may contain the data changing method or may call some other entity that contains the data changing method. Next at 226, a data change event notification is sent to the browser provider. In an embodiment, the browser provider is responsible for receiving one or more of these notifications and at 228 the browser provider may determine if the current browser display potentially needs to be updated. The browser provider may send a node change notification to the browser at 236. The browser knows if the node in question is displayed and therefore needs to be changed, at 238. If the current node does not need to be updated then the example procedure may return to waiting for more user input. If the current node does need to be updated then the browser requests data for the node in question from the browser provider and updates the display at 245.

It will be appreciated that while the example flowchart describes actions in a singular progression, a system implementing this example procedure may have several processors, several threads, or any other implementation known in the art such that subsequent user input may be accepted simultaneously with the update steps being performed in response to prior user input. In other words, it may be the case that the user is able to enter more input and change more data while the browser provider is deciding if the current display potentially needs to be updated. FIG. 2B is only one example embodiment of the present invention. In other example procedures the browser provider may not merely forward a notification to the browser but may "repackage" all data change event notifications. In another example procedure the browser provider may only send a fixed number (e.g. three) of notifications (e.g. update node, update subtree, and delete node) to the browser. In this example procedure the browser provider may "repackage" (and may consolidate if possible) all data change event notifications into one or more of the fixed number of browser provider to browser notifications.

FIG. 3 shows an example system configured to implement the dual browser design which may implement the two step update method described above. The system may provide a hierarchal display of nodes to a browser, where each node represents an object or object type within a system, for example a HCM system. A user may navigate among a set of nodes of the system, the nodes arranged in a predetermined hierarchy. Each node may have parent, child, and sibling relationships with other nodes.

For example, the system includes a server 300. For example, the server 300 may include a processor configured to execute one or more browser providers 302. The server 300 may also be configured to execute a HCM system or any other enterprise system. In an embodiment, server 300 may have any number of other standard components known in the art; examples include user I/O, network I/O, storage, etc.

In an embodiment, the browser provider 302 may be configured to provide information related to hierarchy and relationships among nodes. Each group of nodes in the system may be associated with a browser provider 302, which are easily added or modified for new groups of nodes. For example, new object types may be supported by simply adding an associated browser provider 302. For example, a group of nodes may be nodes that all relate to a single root node. For example, a group of nodes may be nodes that are logically related. In an embodiment, browser provider 302 is configured to receive notifications about data changes occurring in the node or nodes associated with that browser provider. Browser provider 302 is further configured to send update notifications to browser 314.

In an embodiment, the server 300 is in communication with a memory 304. The memory 304 may be configured to store one or more nodes 306 and one or more sets of data 308. A node 306 may represent an object or object type within the HCM system. A data set 308 may include information associated with a node 306.

In an embodiment, the server 300 is in communication with a terminal 312 over a network 310. The network 310 may be configured to carry information. For example, the network 310 may be the Internet or another network. The terminal 312 may be a user-accessible computing device, such as a personal computer, a cellular device, etc.

The terminal 312 may execute a browser 314, which provides a user interface to the HCM system to a user 316. The browser 314 may be a conventional browser, for example, a web browser, or a proprietary browser designed for the HCM system. In an embodiment, the browser is configured to allow a user to navigate among a hierarchy of nodes, for example, object types in the HCM system. In a further embodiment, the browser 314 is further configured to display and allow the user to interact with tool nodes. The browser 314 may be further configured to allow the user to update data through the tool nodes.

It will be appreciated that a hierarchy may be nested. For example, a first set of nodes may be accessed via a first browser provider. A second set of nodes may be children of a node within the first set of nodes. The second set of nodes may be accessed via a second browser provider. Thus, any number of different node types may be displayed in any hierarchy via any number of browser providers.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

What is claimed is:

1. A method for updating a dual layer browser in a system, comprising:
    receiving, by at least one browser provider of a first browser software layer of the dual layer browser, at least one notification that a data changed event has occurred at a data layer, wherein the at least one browser provider is associated with at least one node of a data tree structure in the data layer, and the at least one browser provider includes hierarchy information and interface information about the at least one node of the data tree structure associated with the at least one browser provider, wherein each node has at least one of a (1) parent (2) child or (3) sibling relationship with at least one other node of the data tree structure;
    retrieving, by the at least one browser provider, at least one of (1) a node name (2) a node context menu (3) a node icon and (4) child/parent relationship information associated with the at least one node;
    determining, by the at least one browser provider, whether the data changed event affects at least one node associated with a browser display, wherein the at least one node associated with the browser display is one of (1) currently displayed on the browser display and (2) not currently displayed on the browser display;
    if the data changed event affects the at least one node associated with the browser display:
        repackaging, by the at least one browser provider, the at least one notification that a data changed event has occurred;
        sending, by the at least one browser provider, the at least one repackaged notification to a second browser software layer of the dual layer browser, wherein the second browser software layer manages display of the at least one node on the browser display;
    if the data changed event does not affect the at least one node associated with the browser display:
        parsing out, by the at least one browser provider, the data changed event;
    determining, by the second browser software layer, whether the at least one node affected by the data changed event is displayed on the browser display;
    if the at least one node affected by the data changed event is displayed on the browser display:
        sending, by the second browser software layer, a request to the browser provider for information associated with the at least one node affected by the data changed event required to update the browser display;
        sending, with the at least one browser provider, the requested information to the second browser software layer,
    wherein the second browser software layer is configured to, in response to the receipt of the requested information, update the browser display to reflect changes identified in the requested information; and
    if the at least one node affected by the data changed event is not displayed on the browser display:
        retrieving, from a user, input corresponding to at least another changed data event at the data layer.

2. The method of claim 1, wherein the first browser software layer is configured to consolidate a plurality of incoming notifications.

3. The method of claim 1, wherein the first browser software layer is configured with specific information of the system.

4. The method of claim 1, wherein the second browser software layer is a browser configured to display a hierarchy of nodes.

5. The method of claim 4, wherein the repackaged notifications passed on to the second browser software layer include at least one of the updating of a single node, the updating of a subtree, or the deletion of a node.

6. The method of claim 4, wherein the browser contains only general information about the node hierarchy and is configured to receive specific information about the hierarchy from the first browser software layer; and
    wherein the first browser software layer is configured to contain the specific information about the node hierarchy.

7. The method of claim 1, wherein the second browser software layer is at a terminal in communication with a server over a network.

8. The method of claim 4, wherein the nodes are objects in a human capital management system.

9. A non-transitory computer-readable storage medium encoded with instructions configured to be executed by a processor, the instructions which, when executed by the processor, cause the performance of the method of claim 1.

10. The medium of claim 9, wherein the first browser software layer is configured to consolidate a plurality of incoming notifications.

11. The medium of claim 9, wherein
    the first browser software layer is configured with specific information of the system.

12. A system for updating a dual layer browser, comprising:
    a processor, the processor configured to:
    receive, by at least one browser provider of a first browser software layer of the dual layer browser, at least one notification that a data changed event has occurred at a data layer, wherein the at least one browser provider is associated with at least one node of a data tree structure in the data layer, and the at least one browser provider includes hierarchy information and interface information about the at least one node of the data tree structure associated with the at least one browser provider, wherein each node has at least one of a (1) parent (2) child or (3) sibling relationship with at least one other node of the data tree structure;
    retrieve, by the at least one browser provider, at least one of (1) a node name (2) a node context menu (3) a node icon and (4) child/parent relationship information associated with the at least one node;
    determine, by the at least one browser provider, whether the data changed event affects at least one node associated with a browser display, wherein the at least one node associated with the browser display is one of (1)

currently displayed on the browser display and (2) not currently displayed on the browser display;

if the data changed event affects at least one node associated with the browser display:
repackage, by the at least one browser provider, the at least one notification that a data changed event has occurred;
send, by the at least one browser provider, the at least one repackaged notification to a second browser software layer of the dual layer browser, wherein the second browser software layer manages display of the at least one node on the browser display;

if the data changed event does not affect at least one node associated with the browser display:
parse out, by the at least one browser provider, the data changed event;
determine, by the second browser software layer, whether the at least one node affected by the data changed event is displayed on the browser display;

if the at least one node affected by the data changed event is displayed on the browser display:
send, by the second browser software layer, a request to the browser provider for information associated with the at least one node affected by the data changed event required to update the browser display;
send, with the at least one browser provider, the requested information to the second browser software layer,
wherein the second browser software layer is configured to, in response to the receipt of the requested information, update the browser display to reflect changes identified in the requested information; and if the at least one node affected by the data changed event is not displayed on the browser display:
retrieve, from a user, input corresponding to at least another changed data event at the data layer.

13. The system of claim 12, comprising a terminal in communication with a server over a network, where the terminal is configured to run the second browser software layer.

14. The system of claim 12, where the processor is configured to consolidate a plurality of incoming notifications.

15. The system of claim 12, wherein the second browser software layer is configured to display nodes in a hierarchy.

16. The system of claim 15, wherein the nodes are objects in a human capital management system.

17. The system of claim 15, wherein the repackaged notifications passed on to the second browser software layer include at least one of the updating of a single node, the updating of a subtree, or the deletion of a node.

18. The system of claim 15, wherein the second browser software layer contains only general information about the node hierarchy and is configured to receive specific information about the hierarchy from the processor executing instructions from first browser software layer;
the first browser software layer being configured to contain the specific information about the node hierarchy.

19. The medium of claim 11, wherein the second browser software layer is configured to run on a terminal in communication with the first browser software layer.

* * * * *